United States Patent
Elias et al.

(10) Patent No.: US 8,005,088 B2
(45) Date of Patent: Aug. 23, 2011

(54) SCALABLE MANAGEMENT SYSTEM FOR MPLS BASED SERVICE PROVIDERS

(75) Inventors: Mark Elias, Eastpointe, MI (US); Jae-Sun Chin, Helotes, TX (US); Sherry Soja-Molloy, Allen Park, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1190 days.

(21) Appl. No.: 11/332,589

(22) Filed: Jan. 17, 2006

(65) Prior Publication Data

US 2007/0165540 A1  Jul. 19, 2007

(51) Int. Cl.
*H04L 12/56* (2006.01)

(52) U.S. Cl. ........ 370/393; 370/395.5; 370/409; 370/474; 709/236; 709/245

(58) Field of Classification Search ........ 370/351, 370/389, 392, 395.5, 401, 352, 254, 393, 370/397, 399, 395.31, 409, 420, 474, 475; 709/220, 232, 236, 238, 223, 245; 726/15, 726/1

See application file for complete search history.

(56) References Cited

U.S. PATENT DOCUMENTS

| | | | | |
|---|---|---|---|---|
| 7,002,960 | B1* | 2/2006 | Golan et al. ........... | 370/393 |
| 2002/0103921 | A1* | 8/2002 | Nair et al. ........... | 709/232 |
| 2002/0181477 | A1* | 12/2002 | Mo et al. ........... | 370/401 |
| 2003/0142669 | A1* | 7/2003 | Kubota et al. ........... | 370/389 |
| 2003/0212771 | A1* | 11/2003 | Kwon et al. ........... | 709/220 |
| 2006/0187855 | A1* | 8/2006 | Booth et al. ........... | 370/254 |
| 2006/0198368 | A1* | 9/2006 | Guichard et al. ........... | 370/389 |
| 2007/0110025 | A1* | 5/2007 | Guichard et al. ........... | 370/351 |
| 2007/0121524 | A1* | 5/2007 | Rangarajan et al. ........... | 370/252 |

OTHER PUBLICATIONS

Rosen et al., "BGP/MPLS VPNs", Network Working Group, Mar. 1999, p. 9.*
Sethom, K., Afifi, H., and Pujolle, G. 2004. Wireless MPLS: a new layer 2.5 micro-mobility scheme. In Proceedings of the Second international Workshop on Mobility Management &Amp; Wireless Access Protocols (Philadelphia, PA, USA, Oct. 1-1, 2004). MobiWac '04. ACM, New York, NY, 64-71. DOI= http://doi.acm.org/10.1145/1023783.1023796.*
Cisco Systems et al., "Internetworking Technologies Handbook—Chapter 28: MPLS/Tag Switching," pp. 433-444 (pp. 28-1-28-8) (Dec. 2000).

* cited by examiner

*Primary Examiner* — Kwang B Yao
*Assistant Examiner* — Jeffrey Rutkowski
(74) *Attorney, Agent, or Firm* — Greenblum & Bernstein, P.L.C.

(57) ABSTRACT

A management system manages multiple multi-protocol label switching (MPLS) virtual private networks (VPNs), the VPNs having overlapping IP addresses. The system includes a storage storing a file that associates a host name with an IP address and a route distinguisher. The host name corresponds to a network element within one of the customer VPNs. The system also includes a label obtaining system that obtains at least one label for the host name based upon the associated IP address and route distinguisher. The system also has a packet construction system that creates packets destined for the network element using the obtained label(s).

16 Claims, 3 Drawing Sheets

SCALABLE MANAGEMENT SYSTEM FOR MPLS BASED SERVICE PROVIDERS

BACKGROUND

1. Field of the Disclosure

The present disclosure relates to network management. More particularly, the present disclosure relates to reducing the number of management systems required to manage multi-protocol label switching (MPLS) virtual private networks (VPNs).

2. Background Information

In order for service providers to manage customer networks, the service provider connects to the customer network elements to be managed via the TCP/IP protocol. A network element is a device such as a router or switch. Managing these devices typically requires the customer network element to have a unique IP address, a 32 bit value.

Customers can, through what is known as RFC1918 addressing, use private (reusable) addresses within their own networks, creating the potential for duplicate IP addresses. Duplicate IP addresses create a serious identity problem because network management systems (NMSs) use the IP addresses to identify the managed end devices. Today, most network management systems use existing tables in the operating system (typically the "host" file) to associate host names (equipment/site names) with IP addresses. In any given host computer, the IP addresses must be unique to point to discrete network elements. Once an IP address for a given site is known, it can be used by normal network processes to forward data packets using established IP forwarding rules.

When customers use the same blocks of private (reusable) IP addresses for their internal networks, service providers need to deploy separate element management systems (EMSs) (or NMSs) and access routers or deploy complex address translation techniques to connect to these devices uniquely. If enough customers were to use the same private IP address blocks, the possibility exists that the service provider would need to deploy a different management platform to support each customer. While this solution works, each additional network management system increases the overall costs to the service provider and adds to the complexity of the overall management solution. There are additional difficulties with routing of these duplicate addresses that also increase the infrastructure costs.

However, network management systems still cannot handle overlapping IP addresses.

DETAILED DESCRIPTION

Figure 1:
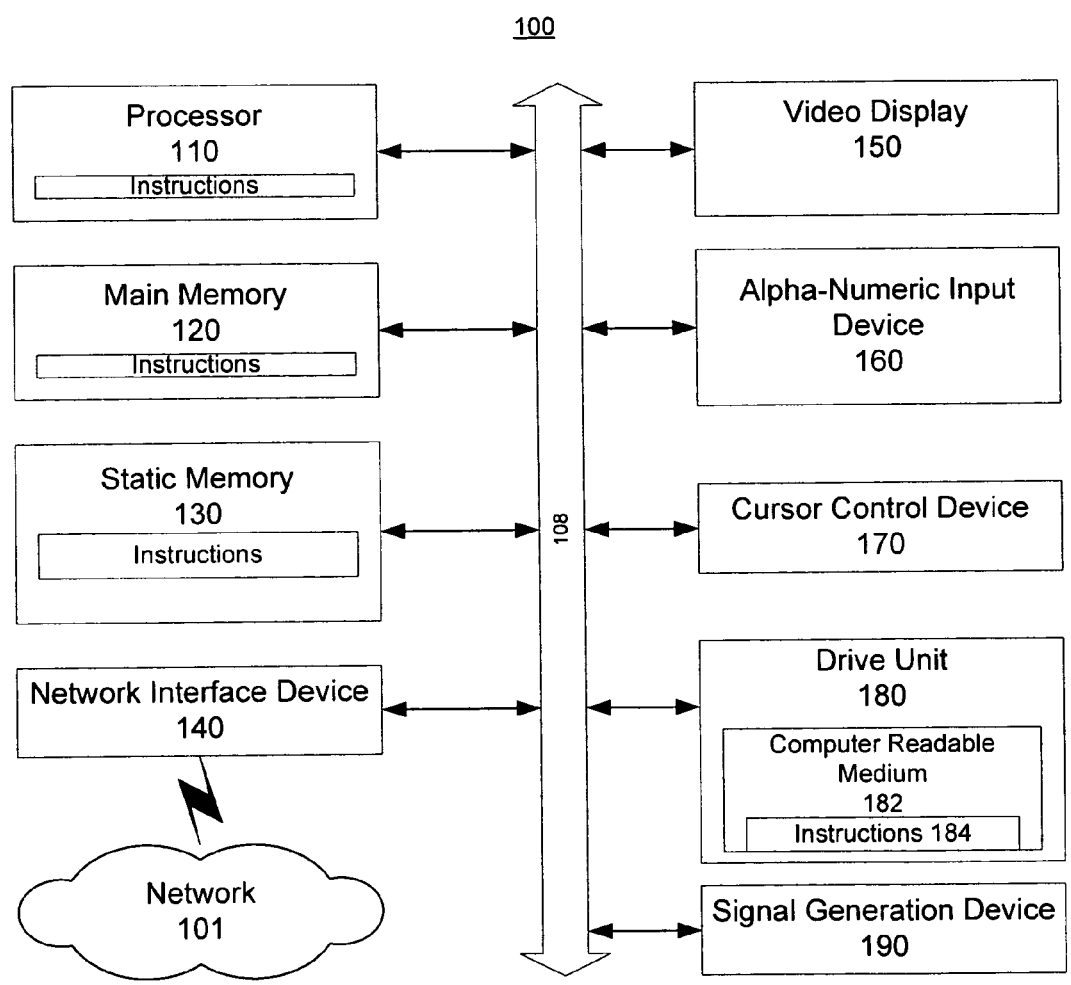
FIG. 1 shows an exemplary general computer system that can operate as a scalable network management system.

In view of the foregoing, the present invention, through one or more of its various aspects, embodiments and/or specific features or sub-components, is thus intended to bring out one or more of the advantages as specifically noted below.

Cost effective scaling of network management systems is enabled to meet the challenges of newer network-based Virtual Private Networking (VPN) services based on RFC 2547 entitled "BGP/MPLS VPNs," the disclosure of which is expressly incorporated by reference herein in its entirety.

In one aspect of the present invention, a management system manages customer multi-protocol label switching (MPLS) virtual private networks (VPNs), the VPNs having overlapping IP addresses. The system includes a storage storing a file that associates a host name with an IP address and a route distinguisher. The host name corresponds to a network element within one of the customer VPNs. The system also includes a label obtaining system that obtains label(s) for the host name based upon the associated IP address and route distinguisher. The system also has a packet construction system that creates packets destined for the network element using the obtained label(s).

In one embodiment, the system also has a concatenating system that concatenates the obtained IP address and the obtained route distinguisher to create a VPNv4 address. The label obtaining system uses the VPNv4 address to obtain the label(s). The overall system may also include a forwarding system that forwards the created packet using MPLS forwarding rules.

In one aspect, the obtaining system obtains the label(s) from a label forwarding information base (LFIB). In another aspect, the created packet is an IP packet that identifies the network element. The management system can be an element management system and/or a network management system.

In one embodiment, a computer readable medium stores a computer program for use when managing a plurality of customer multi-protocol label switching (MPLS) virtual private networks (VPNs), the VPNs having overlapping IP addresses. The medium includes a host file that associates a host name with an IP address and a route distinguisher. The host name corresponds to a network element within one of the customer VPNs.

The medium can include a label obtaining code segment that obtains a label(s) for the network element based upon the IP address and route distinguisher associated with the host name; as well as a packet construction code segment that creates packets destined for the network element using the obtained label(s).

The medium can also include a concatenating code segment that concatenates the obtained IP address and the obtained route distinguisher to create a VPNv4 address. The label obtaining code segment then uses the VPNv4 address to obtain the label(s).

The medium can include a forwarding code segment that forwards the created packet using MPLS forwarding rules. In one embodiment, the obtaining code segment obtains the label(s) from a label forwarding information base (LFIB). The created packet can be an IP packet that identifies the network element. The medium can reside on an element management system and/or a network management system.

In yet another aspect, a virtual private network (VPN) management method manages customer multi-protocol label switching (MPLS) VPNs, the VPNs having overlapping IP addresses. The method includes associating a host name with an IP address and a route distinguisher. The host name corresponds to a network element within one of the customer VPNs.

The method can also include obtaining a label(s) for the network element based upon the IP address and route distinguisher associated with the host name; and creating packets destined for the network element using the obtained label(s).

The method can also include concatenating the obtained IP address and the obtained route distinguisher to create a VPNv4 address. In this case, the obtaining further includes using the VPNv4 address to obtain the label(s).

In one embodiment, the method includes forwarding the created packet using MPLS forwarding rules. In another embodiment, the obtaining includes obtaining the label(s) from a label forwarding information base (LFIB).

Referring to FIG. 1, a description is now provided of an illustrative embodiment of a general computer system 100, on which the network management system functionality can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Figure 2:
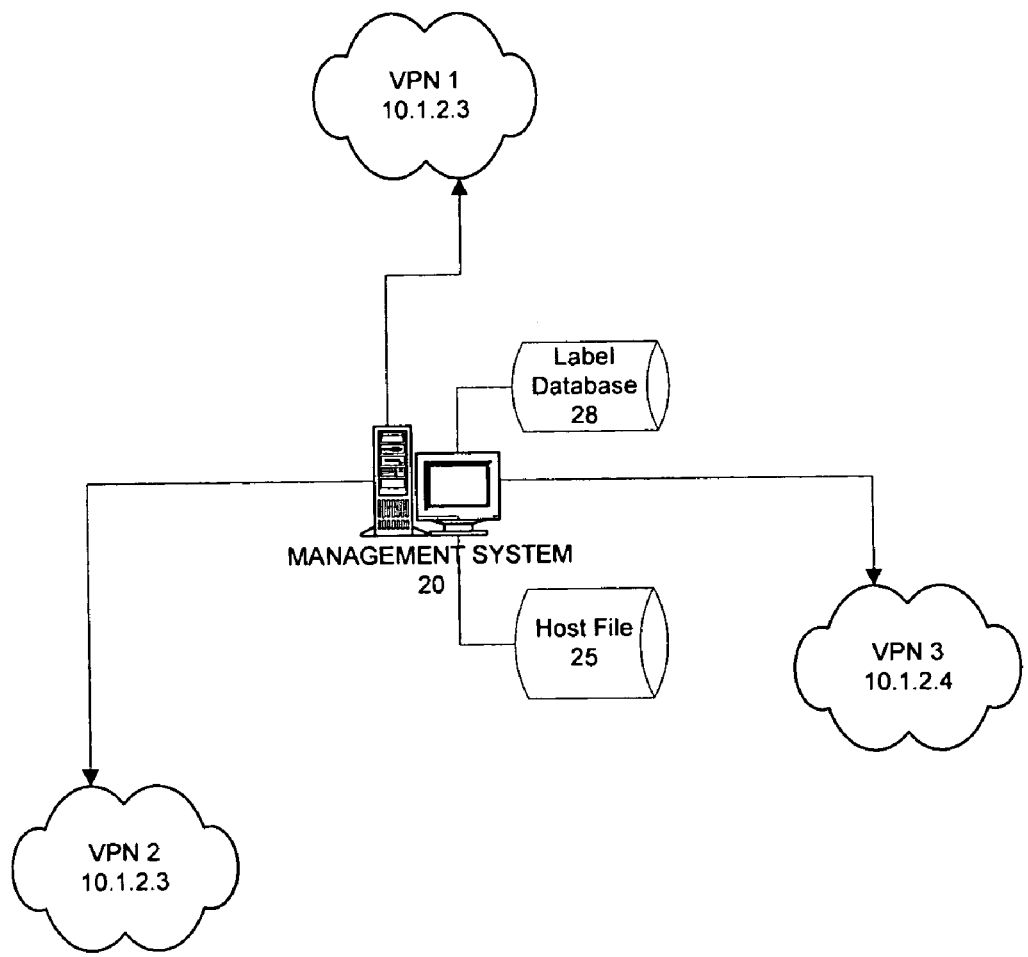
FIG. 2 shows an exemplary system including a MPLS enabled network management system, according to an aspect of the present invention.

Referring to FIG. 2, a management system 20, such as a network management system (NMS) can manage multiple virtual private networks (VPNs) 1, 2, 3. VPN 1 has an IP address of 10.1.2.3; VPN 2 also has an IP address of 10.1.2.3; and VPN 3 has an IP address of 10.1.2.4. The managed VPNs 1, 2, 3 are owned by customers of a service provider, which defines the customer VPNs 1, 2, 3. The VPN 1, 2, 3 share resources and infrastructure of the service provider's network, and employ the multiprotocol label switching (MPLS) protocol. In one embodiment, the service provider's network is owned by the entity that owns the management system 20. The VPNs may be based upon RFC 2547.

In order to manage the VPN 1, 2, 3, an operating system of the NMS 20 directly exchanges routing information with the MPLS VPNs 1, 2, 3. The NMS 20 thus becomes part of each customer VPN 1, 2, 3. Therefore, because each customer VPN 1, 2, 3 is an instance of an MPLS VPN, the NMS 20 shares the VPN definitions.

In one embodiment, the operating system of the management system 20 is a UNIX based operating system. In this embodiment, the operating system for the management system 20 can plug directly into an MPLS VPN network using commercial extensions to the UNIX operating system, such as GateD MPLS, available from NextHop Technologies, Inc. By accessing the MPLS VPN network, the management system 20 can use VPNv4 addresses assigned by the service provider. As described below, the management system 20 can access a host file 25 to help determine VPNv4 addresses. Thus, an application on the management system 20 that manages the faults, configuration, accounting, performance and security of the customer VPNs 1, 2, 3 is able to manage and monitor the customer networks 1, 2, 3 even when overlapping IP addresses exist.

A label database 28 is populated with labels that the management system 20 can retrieve. The management system 20 uses VPNv4 addresses to obtain the labels, as discussed in more detail below.

Figure 3:
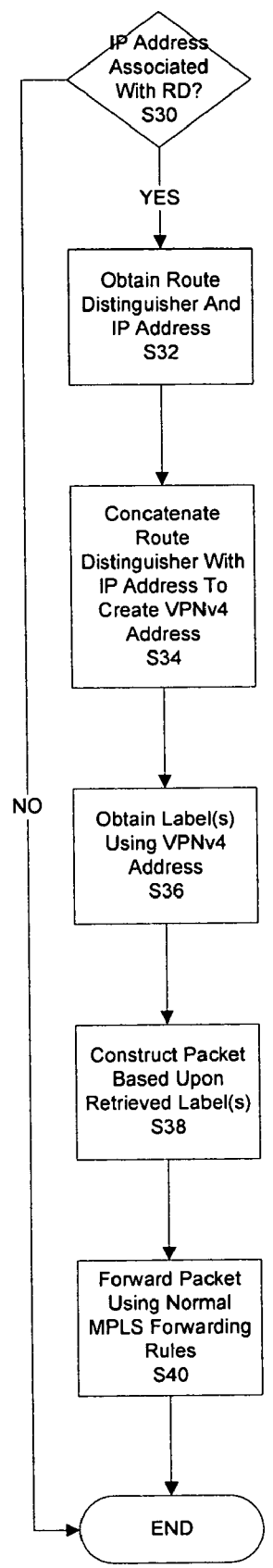
FIG. 3 show an exemplary process for managing an MPLS VPN, according to an aspect of the present invention.

Referring to FIG. 3, exemplary processing in the new MPLS enabled NMS 20 is now described. Initially, at step S30, it is determined whether any VPNs 1, 2, 3, have IP addresses with associated route distinguisher (RD). If not (S30:NO), each address is assumed to be unique and normal IP forwarding/routing rules apply. If an RD associated with an IP address is found (S30:YES), then the MPLS processing begins.

At step S32, the management software looks at a special version of the "host" file 25. The host file is part of a standard UNIX operating system. It provides a mechanism for linking a host name (equipment/site name) with an IP address. This special version 25 includes the host name, IP address, and the route distinguisher (RD) for the customer. Thus, at step S32, the route distinguisher and IP address are obtained for the customer.

Instead of the NMS operating system performing a normal IP packet forwarding function, it concatenates the RD and IP Address at step S34. The combination of these two elements is known as a VPNv4 address.

At step S36, the VPNv4 address is then used to perform a lookup for the appropriate label(s) from a label database 28 populated on the NMS 20 by the MPLS extensions to the operating system. The label database 28 can be a well known information file that has forwarding information for MPLS, such as a "label forwarding information base (LFIB)," except that VPNv4 addresses are included instead of or in addition to standard IP addresses.

At step S38, the label(s) retrieved are then used to construct the appropriate labeled packet. The packet includes labels for both MPLS forwarding (to get to the correct MPLS edge device) and VPN forwarding (to get to the correct VPN). The packet also includes a normal IP packet that points to the end device, the normal IP address being used once within the customer's VPN. Finally, at step S40, the packets are forwarded using normal MPLS forwarding rules.

Although the above description is with reference to a network management system, it is understood that an element management system (EMS) can also be upgraded in a similar manner, so that the EMS can interact with the upgraded NMS.

An advantage of the upgraded system is that it can offer a significant cost savings for the service provider in both hardware and software. The service provider no longer has to build new network management domains (each having a management application) when an overlapping IP address is discovered. Each of the applications has a significant cost to the service provider.

In addition to the reduction of network management systems, both the hardware and software, there is also a significant savings in the routing infrastructure used to provide customer connectivity. Because these systems are dependent on unique IP addresses, there is also a reduction in the complexity of the infrastructure supporting the network management and monitoring systems.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A network management system for managing a plurality of customer multi-protocol label switching (MPLS) virtual private networks (VPNs), the VPNs having overlapping interne protocol (IP) addresses, the system comprising:
a storage, implemented on a network management system node, that stores a host file that associates a host name corresponding to a network element within one of the customer VPNs that have the overlapping IP addresses with an IP address and a route distinguisher;
a label database, populated by the network management system node, that stores at least one multi-protocol label switching label for the host name indexed by a concatenation of the IP address and the route distinguisher; and
a packet constructor that creates packets destined for the network element by using the at least one multi-protocol label switching label obtained from the label database based upon the concatenation of the IP address and the route distinguisher.

2. The system of claim 1,
wherein the concatenation of the IP address and the route distinguisher comprises a VPNv4 address, and
wherein the VPNv4 address is used to obtain the at least one multi-protocol label switching label.

3. The system of claim 1, further comprising:
a forwarder that forwards the packets using MPLS forwarding rules.

4. The system of claim 1,
in which each of the packets comprise an IP packet that identifies the network element.

5. The system of claim 1,
in which the management system comprises an element management system.

6. A non-transitory computer readable medium storing a computer program for use when managing a plurality of customer multi-protocol label switching (MPLS) virtual private networks (VPNs), the VPNs having overlapping IP addresses, the medium comprising:
an associating code segment, recorded on the computer readable medium, that associates a host name corresponding to a network element within one of the customer VPNs that have the overlapping IP addresses with an IP address and a route distinguisher;
a storing code segment, recorded on the computer readable medium, that stores the association in a host file that is stored in a network management system node;
an indexing code segment, recorded on the computer readable medium, that indexes the at least one multi-protocol label switching label for the host name by a concatenation of the IP address and the route distinguisher in a label database; and
a packet constructing code segment, recorded on the computer readable medium, that creates packets destined for the network element using the at least one multi-protocol label switching label for the network element obtained from a label database, populated by the network management system node, based upon a concatenation of the IP address and the route distinguisher associated with the host name.

7. The non-transitory medium of claim 6, wherein the concatenation of the IP address and the route distinguisher comprises a VPNv4 address, and
wherein the VPNv4 address is used to obtain the at least one multi-protocol label switching label.

8. The non-transitory medium of claim 6, further comprising:
a forwarding code segment, recorded on the computer readable medium, that forwards the packets using MPLS forwarding rules.

9. The non-transitory medium of claim 6,
in which the label database comprises a label forwarding information base (LFIB).

10. The non-transitory medium of claim 6,
in which each of the packets comprises an IP packet that identifies the network element.

11. The non-transitory medium of claim 6, in which the non-transitory computer readable medium resides on an element management system.

12. The non-transitory medium of claim 6, in which the non-transitory computer readable medium resides on a network management system.

13. A virtual private network (VPN) management method for managing a plurality of multi-protocol label switching (MPLS) VPNs, the VPNs having overlapping internet protocol (IP) addresses, the method comprising:
associating a host name corresponding to a network element within one of the VPNs that have the overlapping IP addresses with an IP address and a route distinguisher in a host file that is stored in a network management system node;
obtaining at least one multi-protocol label switching label for the network element based upon a concatenation of the IP address and route distinguisher associated with the host name from a label database populated by the network management system node; and
creating packets destined for the network element using the obtained at least one multi-protocol label switching label.

14. The method of claim 13, further comprising:
wherein the concatenation of the IP address and the route distinguisher comprises a VPNv4 address,
wherein the VPNv4 address is used to obtain the at least one multi-protocol label switching label.

15. The method of claim 13, further comprising:
forwarding the packets using MPLS forwarding rules.

16. The method of claim 13,
in which the label database comprises a label forwarding information base (LFIB).

* * * * *